US010005495B2

(12) United States Patent
Töller et al.

(10) Patent No.: US 10,005,495 B2
(45) Date of Patent: Jun. 26, 2018

(54) ASSEMBLY FOR A MOTOR VEHICLE WITH AN AUXILIARY FRAME AND AN IMPACT ABSORPTION STRUCTURE

(71) Applicant: Kirchhoff Automotive Deutschland GmbH, Attendom (DE)

(72) Inventors: Marco Töller, Köln (DE); Josef Bartzik, Iserlohn (DE); Alexander Günther, Olpe (DE)

(73) Assignee: KIRCHHOFF AUTOMOTIVE DEUTSCHLAND GMBH, Attendorn (DE)

(*) Notice: Subject to any disclaimer, the term of this patent is extended or adjusted under 35 U.S.C. 154(b) by 40 days.

(21) Appl. No.: 15/344,804

(22) Filed: Nov. 7, 2016

(65) Prior Publication Data

US 2017/0129540 A1 May 11, 2017

(30) Foreign Application Priority Data

Nov. 9, 2015 (DE) .................. 10 2015 119 231

(51) Int. Cl.
*B60N 99/00* (2006.01)
*B62D 21/15* (2006.01)
*B62D 29/00* (2006.01)

(52) U.S. Cl.
CPC ......... *B62D 21/155* (2013.01); *B62D 29/008* (2013.01); *B60Y 2306/01* (2013.01); *B60Y 2410/121* (2013.01)

(58) Field of Classification Search
CPC .................. B62D 21/155; B62D 29/008; B60Y 2306/01; B60Y 2410/121
See application file for complete search history.

(56) References Cited

U.S. PATENT DOCUMENTS

| 6,058,673 | A | 5/2000 | Wycech |
| 6,305,136 | B1 | 10/2001 | Hopton et al. |
| 6,341,467 | B1 | 1/2002 | Wycech |
| 7,762,595 | B2 | 7/2010 | Enderich et al. |
| 9,446,799 | B2 | 9/2016 | Franzpotter et al. |

(Continued)

FOREIGN PATENT DOCUMENTS

| DE | 19827549 A1 | 12/1999 |
| DE | 10047880 A1 | 6/2001 |

(Continued)

OTHER PUBLICATIONS

European Search Report dated Mar. 23, 2017 in related application EP 16193784.9.

(Continued)

*Primary Examiner* — Lori L Lyjak
(74) *Attorney, Agent, or Firm* — Polson Intellectual Property Law, PC; Margaret Polson

(57) ABSTRACT

The disclosure relates to an assembly for a motor vehicle with an auxiliary frame to connect to a wheel suspension, whereby the auxiliary frame may be constructed in a shell construction having an upper shell and a lower shell. The shells may enclose an internal shell space and be rigidly connected to each other. The assembly may also comprise a shock-absorbing structure. The shock-absorbing structure can be fully or partially integrated in the internal shell space of the auxiliary frame in the form of an insert and immovably positioned within it.

18 Claims, 3 Drawing Sheets

(56) References Cited

U.S. PATENT DOCUMENTS

| | | |
|---|---|---|
| 2001/0022437 A1 | 9/2001 | Suzuki |
| 2006/0152041 A1 | 7/2006 | Igarashi et al. |
| 2008/0061602 A1 | 3/2008 | Czaplicki et al. |
| 2010/0127520 A1 | 5/2010 | Ginja et al. |
| 2010/0244484 A1* | 9/2010 | Nakaura ................. B60R 21/38 296/187.04 |
| 2011/0104413 A1 | 5/2011 | Mendibourne et al. |
| 2012/0043019 A1 | 2/2012 | Belpaire |
| 2014/0291056 A1* | 10/2014 | Takanaga ............. B60K 11/085 180/274 |

FOREIGN PATENT DOCUMENTS

| | | |
|---|---|---|
| DE | 10107960 A1 | 8/2002 |
| DE | 10238668 A1 | 3/2004 |
| DE | 10321573 A1 | 12/2004 |
| DE | 102006012528 A1 | 9/2007 |
| DE | 102007012148 A1 | 9/2008 |
| DE | 602006000566 T2 | 3/2009 |
| DE | 602005005973 T2 | 5/2009 |
| DE | 102009043474 A1 | 5/2010 |
| DE | 102010025555 A1 | 1/2011 |
| DE | 102014223487 A1 | 5/2015 |
| EP | 1052162 A2 | 11/2000 |
| EP | 2251250 A1 | 11/2010 |
| WO | 2005108188 A1 | 11/2005 |

OTHER PUBLICATIONS

European Search Report dated Mar. 23, 2017 in related application EP 16 196 784.9.

* cited by examiner

ASSEMBLY FOR A MOTOR VEHICLE WITH AN AUXILIARY FRAME AND AN IMPACT ABSORPTION STRUCTURE

BACKGROUND

In modern motor vehicles, the wheel bearings are usually attached to the chassis via trailing arms (for example suspension control arms). Typically, an auxiliary frame acts to ensure that such trailing arms are flexibly mounted. This type of auxiliary frame, also known as a subframe or axle carrier, is attached to the chassis, for example to the side member of the motor vehicle. The auxiliary frame may be positioned on a different level to the side member in the z-direction, preferably below it. The auxiliary frame can also incorporate other components. For example, the vehicle's engine can be supported by means of a pendulum support.

In some cases, impact absorption or shock-absorbing structures are attached to the auxiliary frame to form an assembly. The assembly formed by the auxiliary frame and the shock-absorbing structure requires enough space in the x-direction of the vehicle for installation. In this design, the auxiliary frame acts as a support for the shock-absorbing element of the shock-absorbing structure. This type of auxiliary frame, with a shock-absorbing structure that points in the direction of the force of impact to be absorbed (crash structure) is already known, for example from DE 103 21 573 A1 or from DE 60 2006 000 566 T2.

These assemblies, comprising an auxiliary frame and a shock-absorbing structure attached in the direction of the impact to be absorbed, are being used to a satisfactory extent. However, in several vehicles, there is only a very limited amount of installation space available in the wheel suspension area, particularly in the x-direction.

To use these types of assemblies in tight installation spaces, either the auxiliary frame and/or the shock-absorbing structure must be shortened in the x-direction of the vehicle. However, this is not always possible, particularly if the individual components have been designed with a specific functionality in mind meeting certain requirements. In addition, it is sometimes considered a disadvantage that these types of assemblies require a considerable number of individual parts, which also has an impact on the weight of such assembled modules.

DE 60 2005 005 973 T2 discloses a motor vehicle cradle with at least one shell made from pressed sheet metal which has a rear edge that is designed to be fitted to a vertical wall of the chassis. Here, at least one section of the rear edge of the shell forms a supporting surface which can come into contact with the vertical wall in the event of a collision. An example embodiment depicts an auxiliary frame with two shells.

DE 10 2006 012 528 A1 discloses a supporting arrangement for a vehicle which comprises an outer support and an inner support arranged in an elongated hollow space. Here, the inner support is shaped by an extruded section which is held on the outer support by screw fastenings and has several internal chambers. The chambers extend vertically and transversely to a longitudinal extension of the outer support, and there are several internal retaining sections for screw fastenings provided in the extruded section part.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above described problems have been reduced or eliminated, while other embodiments are directed to other improvements.

The terms used herein refer to a vehicle's direction. The x-direction, the y-direction and the z-direction, are defined as follows: The x-direction is the direction of the vehicle's longitudinal axis. The y-direction is the horizontally transverse direction to the vehicle's longitundinal axis. The z-direction is the direction of the height of the car.

One aspect of the present disclosure is to provide an assembly for a motor vehicle comprising an auxiliary frame for connecting to a wheel suspension, as well as a shock-absorbing structure. The assembly may be used in tight installation spaces without suffering any losses in terms of the wheel suspension and the strength of the chassis and/or the design of the shock-absorbing structure. The assembly may additionally allow for more freedom in designing crash behavior.

In one embodiment of an assembly according to the present disclosure, the shock-absorbing structure is fully or partially integrated in the internal shell space of the auxiliary frame and is immovably arranged within it. Therefore, the shock-absorbing structure may take the form of an insert.

Further, the shock-absorbing structure is not necessarily attached to the auxiliary frame in the x-direction, but instead may be fully or partially integrated into it. The full or partial integration of the shock-absorbing structure into the auxiliary frame relates to the fact that all the elements which contribute to the shock-absorption of a vehicle can be located within the auxiliary frame, or some of them can be located within the auxiliary frame. Therefore, along with a shock-absorbing structure integrated into the auxiliary frame, other elements that provide for shock-absorption can also be attached to the auxiliary frame or contribute to the crash performance of the vehicle with the assembly.

In one embodiment, a shell construction is used for the auxiliary frame. For example, the auxiliary frame may comprise an upper and a lower shell. One or more internal shell chambers formed by the shells may be used to integrate the shock-absorbing structure into the auxiliary frame. Thus, the shock-absorbing structure may be in the form of an insert and arranged immovably on the inside of the two shells of the auxiliary frame.

With a fully or partially integrated positioning of the shock-absorbing structure in the internal shell space of the auxiliary frame, the required installation space of the assembly in the x-direction is not necessarily increased, or at least not significantly, compared to previously-known assembly designs wherein the two elements—the auxiliary frame and shock-absorbing structure—are positioned one behind the other in the x-direction.

In a further embodiment, elements for impact absorption are fastened partially inside the auxiliary frame and partially in the traditional outside the auxiliary frame. In this case, a reduction of the installation space in the x-direction is not necessarily the primary focus. Rather, this embodiment may allow for the length of the components or modules that contribute to shock absorption to be extended in the x-direction compared to traditional designs.

By integrating at least part of the shock-absorbing structure into the auxiliary frame, the auxiliary frame then also acts as a shock-absorbing element. In addition, shock absorption may be attributed, in relation to forces that need to be absorbed, to different elements that contribute to the construction of the overall shock-absorbing structure. In certain embodiments, other shock-absorbing elements are attached to the auxiliary frame in the direction of impact and be designed, for example, in such a way that small impacts are absorbed by these elements. For large impacts, these shock-absorbing elements and the auxiliary frame with its integrated shock-absorbing structure will all play a part. An advantage of such embodiments is that in the event of a small-force impact, the auxiliary frame is not involved in shock absorption and is therefore not deformed by the shock absorption. In these cases, only the front, easily replaceable shock-absorbing elements would need to be replaced, and not the auxiliary frame. Therefore, in additional embodiments of the assembly according to the present disclosure, one or more (e.g, two) energy-absorbing elements are fitted to the auxiliary frame with its integrated shock-absorbing structure in the direction of impact, whereby these shock-absorbing elements are configured to deform first for the purposes of shock absorption under a lower level of impact than the auxiliary frame with its integrated shock-absorbing structure.

In addition, the integration of the shock-absorbing structure in the internal shell space of the auxiliary frame also has the advantage that the components which make up the structure of the auxiliary frame—the shells and the shock-absorbing structure—can augment their intended functionality. This and the details below apply regardless of whether the shock-absorbing elements which are additional to the auxiliary frame are fitted in the direction of impact or not. In this way, the shock-absorbing structure can strengthen the shell structure without the need for any other special structures or additional components, as was often required in prior art. In this way, the shock-absorbing structure fully or partially integrated into the auxiliary frame reinforces the auxiliary frame when the vehicle is being driven normally.

Likewise, with the described integration of the shock-absorbing structure in the internal shell space, both shells are also involved in the shock absorption, at least in the section(s) in which the shock-absorbing structure is positioned. This interaction allows for more freedom in the construction of such an assembly. As a result of the increased functionality for both "absorption of chassis forces" and "shock-absorption", this type of auxiliary frame assembly can meet higher standards, with numerous arrangement possibilities, and be made having a lighter weight than conventional assembly modules with these functionalities. An assembly according to the present disclosure can therefore, if required, also be designed such that the amount of installation space in the x-direction alone is even smaller than that of a conventional auxiliary frame. The installation space that is gained through the use of the described assembly can be used for installing other assemblies/modules or units. In electric hybrid vehicles, traction batteries are often positioned in the floor structure, which are better protected by this type of assembly in the event of a crash. In addition, the disclosed auxiliary frame is suitable for use in the front and rear section of a vehicle, and also for vehicles that only have a small overhang.

Along with advantages already described, the assembly according to the present disclosure also creates the possibility for a new type of construction for the shock-absorbing structure. Previously known shock-absorbing structures only have two shock-absorbing elements arranged with a space between them in the y-direction and attached to the vehicle chassis, typically as an extension of the auxiliary frame. But those according to the present disclosure are at least partially integrated in the internal shell space of the auxiliary frame. The positioning of the shock-absorbing elements in the internal shell space is extremely flexibly, because via the auxiliary frame, forces are guided elsewhere in the chassis, onto the side members or between the connection points on the auxiliary frame onto the side members. In this respect, other load paths can also be used or designed for crash performance compared to conventional assemblies. Moreover, a shock-absorbing element may be positioned at the connection points located behind the shock-absorbing elements so that it aligns as far as possible in the x-direction with the extension of at least part of the side members.

In embodiments with the internal shell space extending in the y-direction, one or more shock-absorbing elements may also be arranged between the two side members. In the event of a load acting on the middle of a bumper of a vehicle, for example in accordance with the so-called pole test, such a load then significantly impacts one or more of these shock-absorbing elements positioned in between the side members.

The integration of a shock-absorbing structure into an internal shell space of the axiliary frame also allows for the construction of individual shock-absorbing elements with different geometries and/or structures to form the overall shock-absorbing structure, for example elements with various cross-sectional geometries and different lengths in the x-direction, y-direction or z-direction. For example, the shock-absorbing elements that are aligned as far as possible with the side member extension can have different cross-sectional geometries, for example smaller geometries. Another shock-absorbing element can be positioned centrally in between outer shock-absorbing elements. The design of the shock-absorbing structure as an insert in the internal shell space of the auxiliary frame also allows for differently designed shock-absorbing structures to be incorporated into the auxiliary frame according to desired requirements. The integration of the shock-absorbing structure may be unnoticeable from the outside of the auxiliary frame, so in this respect, no modifications or other shell designs of the auxiliary frame are required even if the shock-absorbing structure and overall assembly is adapted to different vehicles.

In certain embodiments using individual shock-absorbing elements in combination in the shock-absorbing structure, a shock-absorbing element support may be used to connect these individual shock-absorbing elements at their ends opposite the end that takes the brunt of the impact. Such a shock-absorbing element support typically runs in the y-direction, and may be made from the same material as the shock-absorbing elements. To connect the shock-absorbing elements to the shock-absorbing element support, the end faces of the shock-absorbing elements can rest against the shock-absorbing element support and thus they are supported on the shock-absorbing element support. The shock-absorbing elements may be connected to the shock-absorbing element support by joining, such as a welding process. The shock-absorbing structure may be made from an aluminum alloy suitable for such purposes, for example an alloy from the 6000 series of the Aluminum Association's classification.

In one embodiment, the shells that make up the auxiliary frame in its shell construction can also be made from an aluminum material. For instance, a high-strength aluminum material can be used, for example from the 5000 or 6000 series of the Aluminum Association's classification. The shells can also be made from a steel material. It is also possible to use fiber-reinforced plastic materials to form the auxiliary frame and/or the shock-absorbing structure, or sections thereof.

If the shells of the auxiliary frame are made from metal, the shells may be firmly bonded together, for example by a circumferential weld seam such that the shells or sections of their side walls facing each other are placed together edge-to-edge. An overlapping arrangement is also possible, as well as connection flanges folded outwards. Instead of being bonded, the shells can also be stuck together and/or joined using fasteners, for example rivets. For example, fasteners may penetrate the connecting flanges of the shells which are lying against each other. It is also possible for each of the shells to be made up of several individual components instead of only one piece.

To ensure that the shock-absorbing structure does not move when in its position in the internal shell space, the shock-absorbing structure can be welded to one of the two shells, or joined in some other way, before the other shell is placed on it to seal the internal shell space and the shells are joined together in some way. In some embodiments, ribbing and/or ribbing rows are provided in at least one of the two shells. For example, two ribbed lines in a row may be spaced apart from each other in the area where the shock-absorbing elements are positioned, so the ends of the ribbed lines slot into a shock-absorbing element positioned in between. In such an arrangement, crumple behavior is assisted in the event of a crash. Further, one or more shock-absorbing elements—and with it the shock-absorbing structure—can also optionally be fixed in the x-direction within the internal shell space in these embodiments. On the side pointing away from the side that receives the impact, the shock-absorbing structure can also support itself on an end stop or an end stop arrangement, either in addition to or instead of the fixing described above. For example, a holding element penetrating the shells may be used, such as bolts or the like. In this type of design, the bolts which are required anyway for mounting the auxiliary frame may be used for this purpose. Instead of or in addition to firmly bonding the joint of the shock-absorbing structure to the two shells of the auxiliary frame, the shock-absorbing structure can also be stuck or crimped between the two shells and/or kept in place by means of positive locking. Attaching the shock-absorbing structure to the shells using fasteners is also possible. For example, if the elements which form the shock-absorbing structure, such as the shock-absorbing elements and shock-absorbing element support, have a connection flange on their side facing the shell that is folded to the face of the shell which fasteners may pass through. The surface area that is provided by such a connection flange can also be used if the joining is being made by sticking (e.g., adhesive). In the event of a bonded joint between the shock-absorbing structure and one or more of the two shells of the auxiliary frame, additional fasteners or similar substitutes are not necessary to fix the shock-absorbing structure within the internal shell space of the auxiliary frame. Therefore, and due to the augmented functionalities of the individual components, the weight of such an assembly is reduced considerably compared to conventional approaches. Trial designs showed that weight can be saved very easily in assemblies according to the present disclosure.

Furthermore, for example in the electromobility sector, additional energy storage is often installed in the underbody of the motor vehicle. This causes the vehicle's center of gravity to be lower than in conventional vehicles, and the lower load path becomes more important. In this respect, an assembly according to the present disclosure allows a greater degree of freedom in designing crash behavior in that, for example, the crash function of the side members can be at least partially transferred to the auxiliary frame. In other words, by fully or partially integrating the shock-absorbing into the auxiliary frame and by having the auxiliary frame participating in the "shock absorption" function, the crash performance can be advantageously affected.

In addition to the aspects and embodiments described above, further aspects and embodiments will become apparent by reference to the accompanying drawings forming a part of this specification.

BRIEF DESCRIPTION OF THE DRAWINGS

The assembly according to the present disclosure is further described based on example embodiments in reference to the attached figures.

Before further explaining selected embodiments, it is to be understood that the present invention is not limited in its application to the details of the particular arrangements shown, since the invention is capable of other embodiments. While certain embodiments are illustrated in reference to the figures, it is intended that the embodiments and figures disclosed herein are to be considered illustrative rather than limiting. Also, the terminology used herein is for the purpose of description and not of limitation.

DETAILED DESCRIPTION

Figure 1:
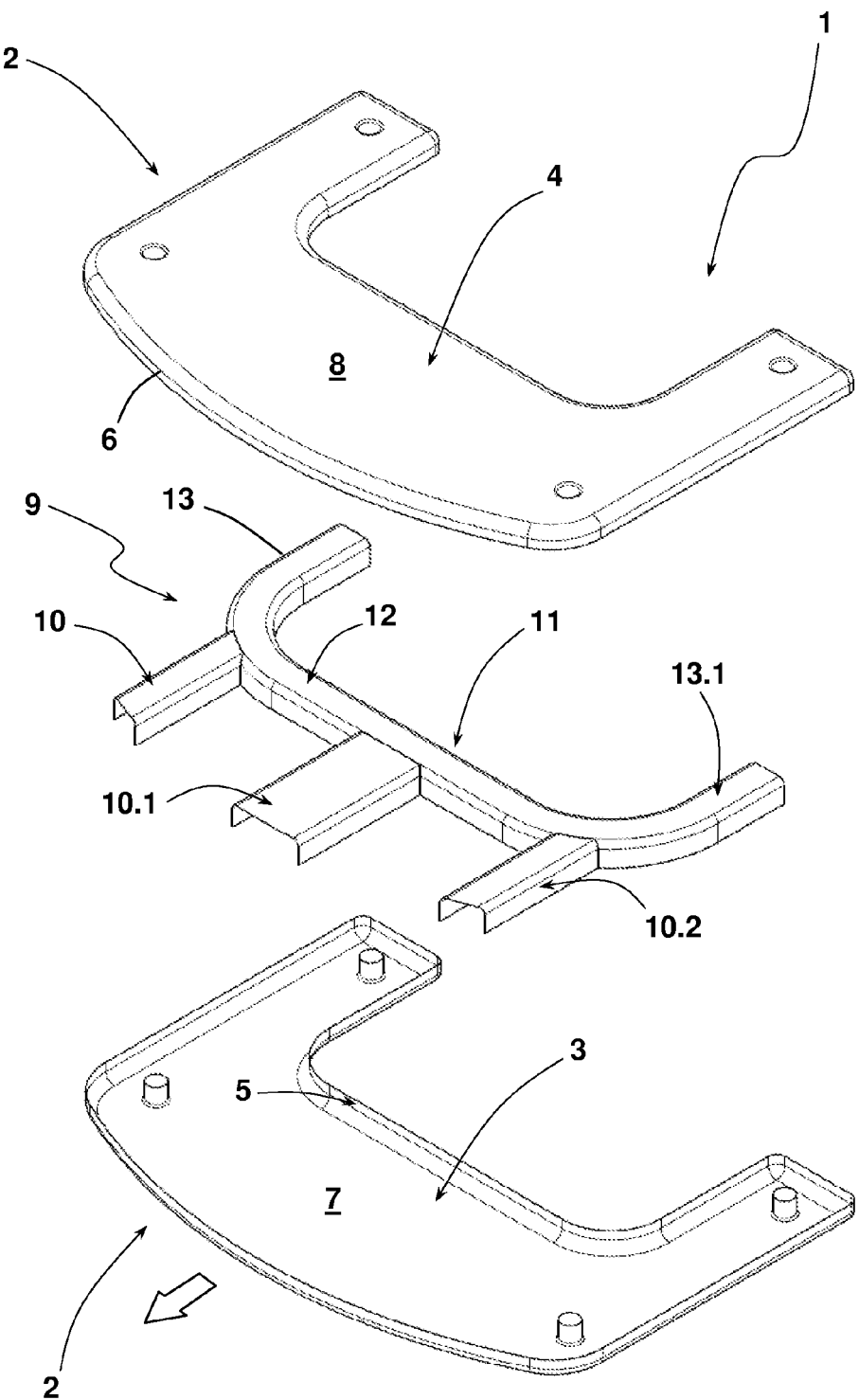
FIG. 1 shows a schematic, perspective diagram in the form of an exploded view of an assembly comprising an auxiliary frame constructed as a shell construction and a shock-absorbing structure integrated therein.

Referring to FIG. 1, the assembly 1 for a motor vehicle comprises a front axle carrier as an auxiliary frame 2. The auxiliary frame 2 may be constructed as a shell construction. In the example embodiment shown, the auxiliary frame 2 is made up of a lower shell 3 and an upper shell 4. Both shells 3, 4 may be molded metal plates, whereby in the example embodiment shown, these are made from an aluminum alloy. Such an aluminum alloy used for the shells 3, 4 is adapted to withstand the forces that pass through the chassis onto the auxiliary frame 2. The shells 3, 4 each have a folded side wall section 5, 6 coming out of the face of each shell 3, 4 towards the respective other shell 4, 3. The sum of the height of both side wall sections 5, 6 defines the distance between the base plates 7, 8 and the shells 3, 4, because the side wall sections 5, 6 of both shells 3, 4 are placed together edge-to-edge to comprise the auxiliary frame 2. To form the auxiliary frame 2, the end faces of the side wall sections 5, 6 are welded together on the outside with a circumferential seam. Therefore, an internal shell space is formed by the lower shell 3 and the upper shell 4 (see FIG. 2). Of course, the side wall sections may be arranged in an overlapping manner or joined together on the end face via outward flanges, or any other suitable means for placing and firmly joining the shells together.

The auxiliary frame 2 is only shown schematically in FIG. 1 and can include other shape formations for the purposes of connecting, e.g., parts of a wheel suspension or other parts. Because various possible shapes of the auxiliary frame are readily conceivable to one of ordinary skill for any given arrangement, and different shapes would still be within the scope of the assembly according to present disclosure, such other embodiments showing suitable shapes of the auxiliary frame are not included herein.

Along with the auxiliary frame 2, the assembly 1 includes a shock-absorbing structure 9. In the example embodiment shown, the shock-absorbing structure 9 consists of three shock-absorbing elements 10, 10.1, 10.2. The shock-absorbing elements 10, 10.1, 10.2 may be constructed as U-shaped profiles oriented in the x-direction of the assembly 1 (with respect to the vehicle in which the assembly 1 is installed). The shock-absorbing elements 10 and 10.2 may be angled, for example, by up to around 20 degrees following the longitudinal extension of the side members of the vehicle.

At least in the depicted embodiment of FIG. 1, the shock-absorbing elements 10 and 10.2 have a smaller cross-sectional surface area than the other shock-absorbing element 10.1 positioned centrally in between these two shock-absorbing elements 10, 10.2. This third element 10.1 is located in the middle of the assembly 1 and therefore also the middle of the vehicle. The shock-absorbing elements 10, 10.1, 10.2 are connected to a shock-absorbing element support 11 via their ends facing away from the end that receives the brunt of the impact. The shock-absorbing element support 11 also has a U-shaped profile, as well as a base 12 that extends in the y-direction and two bent arms 13, 13.1 that extend in the x-direction. The shock-absorbing elements 10, 10.1, 10.2 may be connected to the shock-absorbing element support 11 using a welded seam. This can be seen in FIG. 2 with the reference number 17. The shock-absorbing elements 10, 10.1, 10.2 and the shock-absorbing element support 11 may also be made from an aluminum alloy. In the example embodiment shown, an alloy from the 5000 or 6000 series according to the Aluminum Association's classification is used to make the shock-absorbing elements 10, 10.1, 10.2 and the shock-absorbing element support 11. The geometry of the shock-absorbing element support 11 follows the geometry of the shells 3, 4, and is open in the opposite direction to the vehicle's forward direction of travel and constructed in a C shape. The direction of travel of the vehicle in which the assembly 1 is to be installed is identified by a block arrow in FIG. 1. This arrow corresponds to the x-direction.

In an embodiment not shown in the figures, the shock-absorbing elements are inserted at least partially into the shock-absorbing element support, and are supported on its rear wall and/or on its front wall. In another version, the shock-absorbing structure comprises two shock-absorbing elements that are both bent at right angles. This right-angle bend is carried out in the y-direction so that both shock-absorbing elements comprise a section facing the direction of the energy to be received and absorbed, in which both shock-absorbing elements are spaced closer together than in the other section. The right-angle bends typically form an S shape. These two shock-absorbing elements are connected by a shock-absorbing element support which runs in the y-direction between the elements and connects the two shock-absorbing elements. From the point of view of the impact to be absorbed, this connection is may be positioned before, after or in the area of the beginning of the right-angle bend. In another embodiment not shown, the shock-absorbing elements are constructed without the right-angle bends and are connected via a shock-absorbing element support positioned between them in the y-direction.

Figure 2:
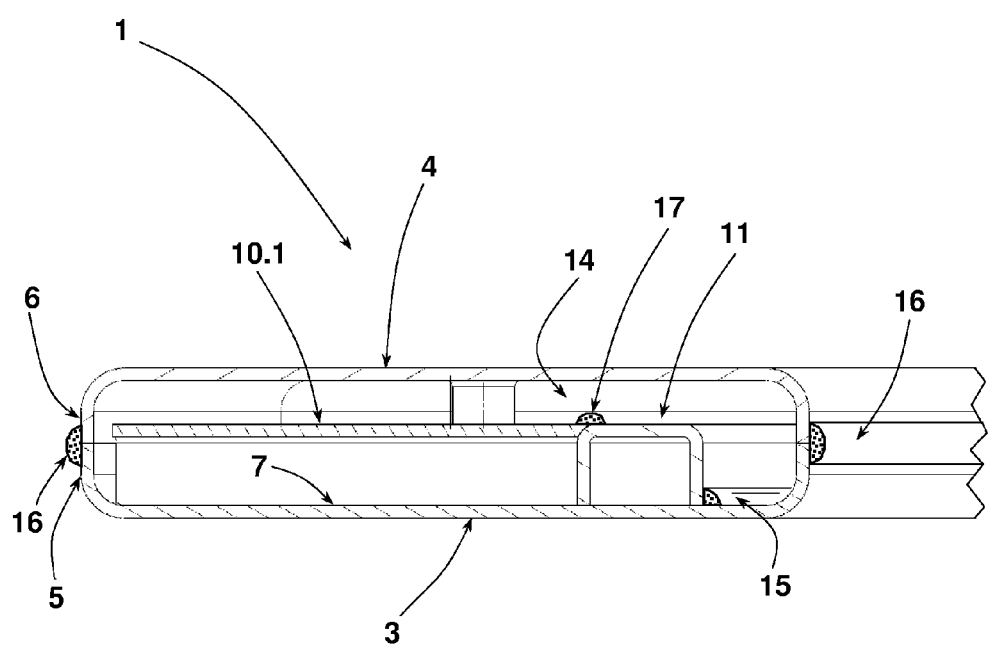
FIG. 2 shows a central, longitudinal view through the assembly of FIG. 1.

In the construction of the assembly 1, the shock-absorbing structure 9 is integrated into the internal shell space 14 of the auxiliary frame 2 and positioned so that it does not move. In the example embodiment shown in FIGS. 1 and 2, the shock-absorbing structure 9 is welded at certain points, with its shock-absorbing elements 10, 10.2, 10.2 and its shock-absorbing element support 11 welded to the lower shell 3. Here, the shock-absorbing structure 9 is welded to the lower shell 3, for example on the rear side of the shock-absorbing element support. In FIG. 2, this welding seam is identified with the reference number 15. The shock-absorbing structure can also be welded to the lower shell 3 at all points of contact along the edges. The U-shaped shock-absorbing elements 10, 10.1, 10.2 are completed by the plate 7 of the lower shell 3 to form a box profile, as seen with respect to the central shock-absorbing element 10.1 in FIG. 2. This also leads to a reduction in the total weight of the module 1. Due to the welded joint described above between the upper shell 4 and the lower shell 3, which is carried out along the joints of the side wall sections 5, 6, the cross-section through shells 3 and 4 forms a box shape. In FIG. 2, the welded seam which connects the shells 3, 4 is identified with the reference number 16. The cross-sectional geometry of the auxiliary frame 2, including its height, has an influence on the forces to be absorbed and the behavior of the auxiliary frame 2, and therefore the overall assembly 1 when absorbing chassis forces that are applied to it. By integrating the shock-absorbing structure 9 into this box profile of the auxiliary frame 2, the assembly 1 is strengthened.

This augmented functionality may be used to ensure that both of these components of the assembly—the auxiliary frame 2 and the shock-absorbing module 9—collaborate and are able to withstand the forces acting upon the assembly in a desired manner. In this way, as described previously, the shock-absorbing structure 9 is involved when the motor vehicle is being driven normally. Conversely, in the event of a collision, the auxiliary frame 2 with both of its shells 3, 4 is involved in absorbing the shock. FIG. 2 also shows a section of the previously-described welded seam 17 joining the shock-absorbing element 10.1 to the base 12 of the shock-absorbing element support 11. The welded seam 17 may follow the U-shaped profile of the shock-absorbing element 10.1. In the same way, the two other shock-absorbing elements 10, 10.2 may also joined to the shock-absorbing element support 11. However, this welded seam is not strictly necessary and can be completely or partially omitted in another example embodiment not shown, as long as a firm fixing in the x, y and z-directions is provided.

If a crash management design is desired that is different to that provided by this example embodiment of the assembly 1, then additional shock-absorbing elements (e.g., crash boxes having a bumper) can be positioned on the auxiliary frame 2. In such an arrangement, it is preferable that these additional shock-absorbing elements deform easily when subjected to small forces resulting from the impact of a collision.

Even though the example embodiment above specifically describes the assembly 1 or the auxiliary frame to be connected to the front wheels of a vehicle, the disclosed concepts can be implemented for a rear axle carrier as well. Such arrangements fall within the scope of the present disclosure.

Figure 3:
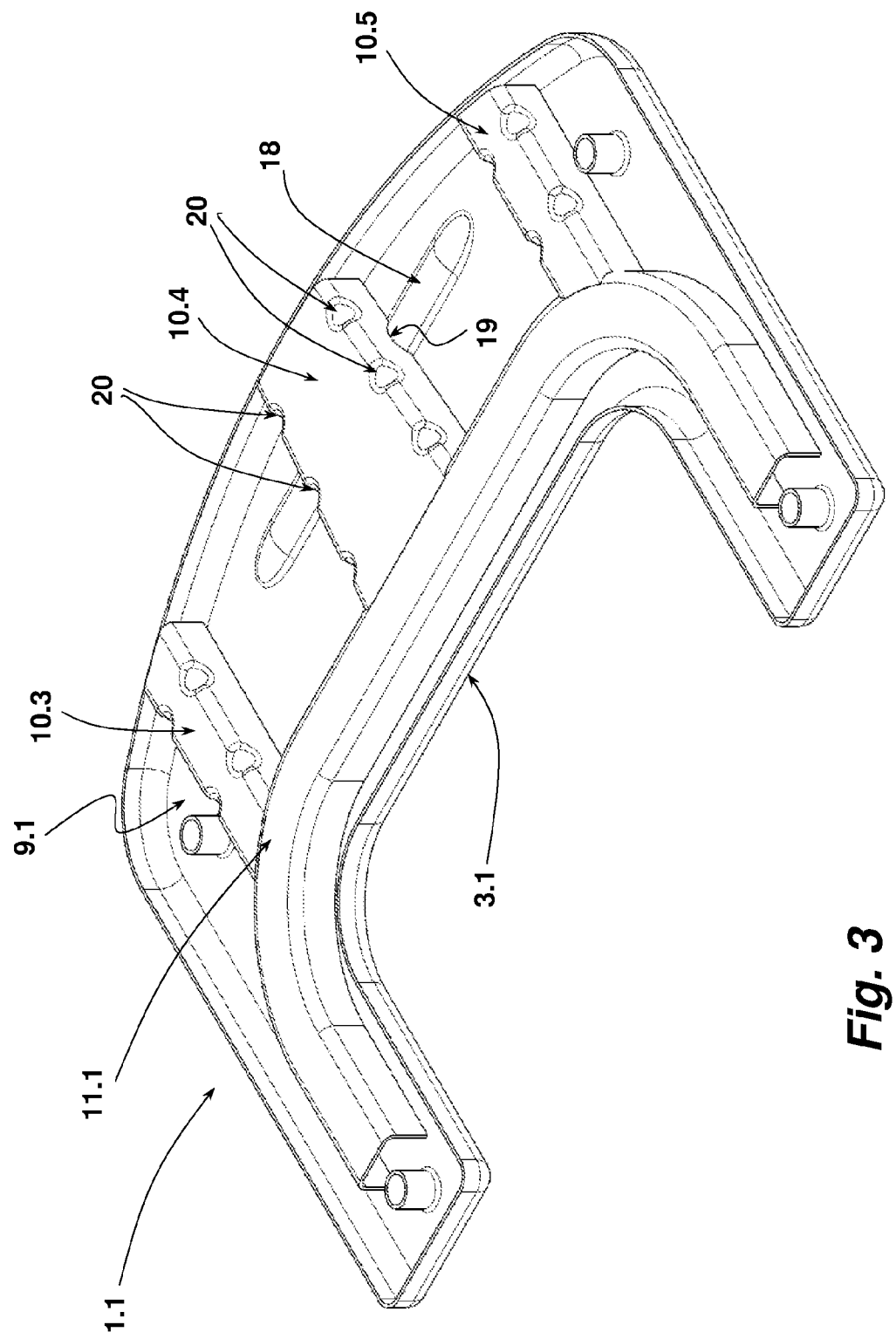
FIG. 3 shows a perspective internal view of another embodiment of the assembly according to the present disclosure.

FIG. 3 gives a perspective view of another embodiment of an assembly 1.1, which for the most part is constructed like the assembly 1 in FIGS. 1 and 2. The assembly 1.1 differs from the previously-described example embodiment with regards to the immovable fixation of the shock-absorbing structure 9.1 in the internal shell space of the auxiliary frame. In assembly 1.1, ribbed lines run along the shells in the y-direction which assist the component's crumple behavior in the event of a crash. In FIG. 3, the upper shell of assembly 1.1 is not shown in order to be able to see the positioning of the shock-absorbing structure 9.1 within the internal shell space. In this embodiment, the lower shell 3.1 has a ribbed line 18 running down the cross-section in the y-direction. Ribbed line 18 slots into a corresponding ribbing recess 19 of the central shock-absorbing element 10.4. The shock-absorbing element 10.4 and the two other shock-absorbing elements 10.3, 10.5 may have imprints 20 on their rear side facing the upper shell (not shown in FIG. 3) at the transfer point of each rear side into the arm. These imprints assist the component's crumple behavior in the event of a crash and increase crash performance. The ribbed lines can be designed differently and can also, for example, run across the entire rear side. With the ribbed line 18 of the lower shell 3.1 slotting into the ribbing recess 19, the assembly 1.1 is firmly fixed in the x-direction.

Ribbed lines created in the y-direction of the lower shell 3.1 (e.g., ribbed line 18) and the upper shell (not shown in FIG. 3) may also act to control the crumple behavior of the shells in the case of shock-absorption (e.g., in the event of a crash). For this purpose, the ribbed line 18 created in the lower shell 3.1 is positioned offset to the rows of ribbed lines in the upper shell (not shown).

The rear-facing ends of shock-absorbing elements 10.3, 10.4, 10.5 may be welded to the shock-absorbing element support 11.1, as already described in the example embodiment in FIGS. 1 and 2.

In the example embodiment of FIG. 3, two of the three shock-absorbing elements 10.3, 10.5 are placed a distance away from the central longitudinal axis of the assembly 1.1. These outer shock-absorbing elements 10.3, 10.5 may be positioned so that they are each roughly aligned in the x-direction with a section of the side member of the vehicle in which the assembly 1.1 is installed, or are slightly offset to a section of them. Therefore, the distance of these shock-absorbing elements 10.3, 10.5 from the longitudinal axis of the assembly 1.1 is larger than their distance from the end of the assembly in the y-direction.

Due to the modular design of the disclosed assembly, the assembly can be adapted to various requirements with appropriate variation in the design of the shells and/or the design of the shock-absorbing structure. The full or partial integration of the shock-absorbing structure into the auxiliary frame also allows for the construction of a variety of load paths, including those which were not possible with previously-known approaches. The integration of the shock-absorbing structure in the internal shell space also ensures that the shock-absorbing elements do not buckle under impact, which would reduce the crash performance.

In the described example embodiments, the shock-absorbing elements each have a U-shaped cross-sectional profile, as does the depicted shock-absorbing element support. However, the cross-sectional geometry can also be designed differently. For example the shock-absorbing elements and/or the shock-absorbing element support may have a closed box profile or a cap-shaped profile, just to name a few designs that may be used along with many other cross-sectional geometries.

While a number of aspects and embodiments have been discussed, those of skill in the art will recognize certain modifications, permutations, additions and sub-combinations are possible. It is intended that the following claims are interpreted to include all such modifications, permutations, additions and sub-combinations, as they are within the true spirit and scope of the present disclosure and the claims. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by selected embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

The invention claimed is:

1. An assembly for connecting to a wheel suspension of a motor vehicle, comprising:
   an auxiliary frame comprising an upper shell and a lower shell, wherein the upper shell and the lower shell enclose an internal shell space and are rigidly joined together; and
   a shock-absorbing structure fully or partially integrated in the internal shell space and immovably positioned within the auxiliary frame.

2. The assembly of claim 1, wherein the shock-absorbing structure comprises at least one shock-absorbing element longitudinally oriented in the x-direction of the assembly.

3. The assembly of claim 2, wherein the at least one shock-absorbing element comprises:
   a first shock-absorbing element and a second shock-absorbing element longitudinally oriented in the x-direction of the assembly;
   wherein the first and second shock-absorbing elements are spaced apart from each other across a central longitudinal axis running in the x-direction of the assembly, the first and second shock-absorbing elements positioned closer to an end of the auxiliary frame than the central longitudinal axis in the y-direction of the assembly.

4. The assembly of claim 3, wherein the first and second shock-absorbing elements are positioned in the x-direction to each align with at least part of a side member of a vehicle.

5. The assembly of claim 4, wherein the shock-absorbing structure further comprises a third shock-absorbing element positioned along the central longitudinal axis between the first and second shock-absorbing elements.

6. The assembly of claim 2, wherein the shock-absorbing structure further comprises a shock-absorbing element support longitudinally oriented in the y-direction of the assembly, the at least one shock-absorbing element connected to the shock-absorbing element support at a first end, the first end opposite a second end of each of the at least one shock-absorbing element, the second end configured to receive the brunt of an impact.

7. The assembly of claim 6, wherein the shock-absorbing element support is constructed in a C-shape structure, the at least one shock-absorbing element attached to the shock-absorbing element support on a side opposite the opening of the C-shape structure.

8. The assembly of claim 6, wherein the at least one shock-absorbing element rests against the shock-absorbing element support and is supported by a front wall of the shock-absorbing element support.

9. The assembly of claim 6, wherein the at least one shock-absorbing element is at least partially inserted into the shock-absorbing element support and supported on a rear wall.

10. The assembly of claim 1, wherein the shock-absorbing structure comprises:
at least two shock-absorbing elements oriented in the x-direction of the assembly and positioned to align with at least a section of a side member of a vehicle, the at least two shock-absorbing elements bent at a right-angle in the y-direction, and
wherein the at least two shock-absorbing elements point in a direction of impact to be absorbed, and the at least two shock-absorbing elements are joined together by a shock-absorbing element support, the shock-absorbing element support designed as a crossmember.

11. The assembly of claim 6, wherein the at least one shock-absorbing element and the shock-absorbing element support are made from the same material.

12. The assembly of claim 10, wherein the at least two shock-absorbing elements and the shock-absorbing element support are made from the same material.

13. The assembly of claim 6, wherein the at least one shock-absorbing element is connected to the shock-absorbing element support by means of a joint.

14. The assembly of claim 10, wherein the at least two shock-absorbing elements are connected to the shock-absorbing element support by means of a joint.

15. The assembly of claim 1, wherein the shock-absorbing structure is immovably positioned in the auxiliary frame by at least one instance of positive locking in the internal shell space, the at least one instance of positive locking provided by the upper shell, the lower shell, and/or a holding element penetrating the auxiliary frame.

16. The assembly of claim 1, wherein the upper and lower shells are made of a different material from the shock-absorbing structure.

17. The assembly of claim 1, wherein the auxiliary frame is constructed in a C-shape which opens opposite from the forward direction of travel of a vehicle.

18. The assembly of claim 6, wherein the at least one shock-absorbing element is at least partially inserted into the shock-absorbing element support and supported in part on a front wall of the shock-absorbing element support.

* * * * *